United States Patent
Xanthos et al.

(10) Patent No.: US 10,320,517 B2
(45) Date of Patent: Jun. 11, 2019

(54) SWITCHED TRANSMIT ANTENNAS WITH NO FEEDBACK FOR MULTIPATH REDUCTION

(71) Applicants: James A Xanthos, Fulton, MD (US); John S Cooper, Jr., Melbourne Beach, FL (US)

(72) Inventors: James A Xanthos, Fulton, MD (US); John S Cooper, Jr., Melbourne Beach, FL (US)

(73) Assignee: J3 TECHNOLOGY LLC, Indialantic, FL (US)

( * ) Notice: Subject to any disclaimer, the term of this patent is extended or adjusted under 35 U.S.C. 154(b) by 0 days.

(21) Appl. No.: 15/614,138

(22) Filed: Jun. 5, 2017

(65) Prior Publication Data

US 2018/0351691 A1    Dec. 6, 2018

(51) Int. Cl.
H04K 3/00 (2006.01)
H04B 7/06 (2006.01)

(52) U.S. Cl.
CPC ............. *H04K 3/62* (2013.01); *H04B 7/0604* (2013.01); *H04B 7/0606* (2013.01); *H04K 3/86* (2013.01)

(58) Field of Classification Search
None
See application file for complete search history.

(56) References Cited

U.S. PATENT DOCUMENTS

| | | |
|---|---|---|
| 4,083,047 A | 4/1978 | Schalow |
| 4,736,460 A | 4/1988 | Rilling |
| 4,748,682 A | 5/1988 | Fukae et al. |
| 4,797,950 A | 1/1989 | Rilling |
| 4,881,274 A | 11/1989 | Tazaki et al. |
| 4,882,587 A | 11/1989 | Vodopia |
| 4,970,518 A | 11/1990 | Cole, Jr. |
| 4,975,926 A | 12/1990 | Knapp |
| 5,036,331 A | 7/1991 | Dallabetta et al. |
| 5,049,838 A | 9/1991 | Voyce |
| 5,317,323 A | 5/1994 | Kennedy et al. |
| 5,347,536 A | 9/1994 | Meehan |
| 5,537,121 A | 7/1996 | Lennen |
| 5,563,917 A | 10/1996 | Sheynblat |
| 5,608,409 A | 3/1997 | Rilling |
| 5,682,799 A | 11/1997 | Dimov |
| 5,724,046 A | 3/1998 | Martin et al. |
| 5,796,773 A | 8/1998 | Sheynblat |
| 5,907,578 A | 5/1999 | Pon et al. |
| 5,917,866 A | 6/1999 | Pon |
| 5,929,811 A | 7/1999 | Rilling |
| 5,949,815 A | 9/1999 | Pon |

(Continued)

*Primary Examiner* — Fayyaz Alam

(57) ABSTRACT

A communication system is provided comprising a transmitter coupled to a switch, which is further coupled to at least two antennas for switching the transmit signal to one of the antennas, with no feedback. The communication system further comprises at least one receiver for receiving the transmitted signal.

The communication system in the present invention is able to help mitigate the effects of multipath. Previous attempts to mitigate the effects of multipath suffer from various problems: increased complexity needed to measure channel parameters and a feedback loop to switch the transmit antenna based on the parameters.

The system is particularly useful when deployed in a MAS system or a jamming system.

20 Claims, 4 Drawing Sheets

(56) References Cited

U.S. PATENT DOCUMENTS

| | | |
|---|---|---|
| 5,966,403 A | 10/1999 | Pon |
| 6,031,884 A | 2/2000 | Pon |
| 6,035,183 A | 3/2000 | Todd et al. |
| 6,063,511 A | 5/2000 | Purinton et al. |
| 6,347,113 B1 | 2/2002 | Hatch |
| 6,407,699 B1 | 6/2002 | Yang |
| 6,414,987 B1 | 7/2002 | Pon |
| 6,430,416 B1 | 9/2002 | Loomis |
| 6,445,927 B1 | 9/2002 | King et al. |
| 6,493,378 B1 | 12/2002 | Zhodzishsky et al. |
| 6,556,615 B1 | 4/2003 | Pon |
| 6,574,459 B1 | 6/2003 | Kaminski et al. |
| 6,603,803 B1 | 8/2003 | Hatch |
| 6,873,250 B2 | 3/2005 | Viana et al. |
| 6,963,303 B1 | 11/2005 | Beisner |
| 7,068,233 B2 | 6/2006 | Thornberg et al. |
| 7,085,307 B2 | 8/2006 | Hudson |
| 7,142,589 B2 | 11/2006 | Valio |
| 7,256,730 B2 | 8/2007 | Hernandez-Pajares et al. |
| 7,257,377 B2 | 8/2007 | Malladi et al. |
| 7,260,370 B2 | 8/2007 | Wang et al. |
| 7,545,334 B2 | 6/2009 | Iio |
| 7,561,048 B2 | 7/2009 | Yushkov et al. |
| 7,719,459 B2 | 5/2010 | Stevens et al. |
| 7,729,724 B2 | 6/2010 | Rofougaran et al. |
| 7,802,171 B2* | 9/2010 | Li .................. H04L 1/0048 714/790 |
| 8,099,132 B2 | 1/2012 | Kim et al. |
| 8,126,096 B2 | 2/2012 | Yang et al. |
| 8,135,351 B2 | 3/2012 | Malladi et al. |
| 8,395,542 B2 | 3/2013 | Scherzinger et al. |
| 8,463,203 B2 | 6/2013 | Higuchi et al. |
| 8,503,578 B2 | 8/2013 | Chen |
| 8,615,200 B2 | 12/2013 | Malladi et al. |
| 8,787,143 B2 | 7/2014 | Malladi |
| 8,811,513 B2 | 8/2014 | Jiang et al. |
| 8,897,723 B2 | 11/2014 | Lee et al. |
| 8,947,298 B2 | 2/2015 | Yamamoto et al. |
| 9,138,170 B2 | 9/2015 | Huang |
| 9,294,239 B2 | 3/2016 | Malladi |
| 9,338,664 B2 | 5/2016 | Tenbroek et al. |
| 9,369,996 B2 | 6/2016 | Higuchi et al. |
| 9,491,776 B2 | 11/2016 | Aryafar et al. |
| 9,500,483 B1 | 11/2016 | Stockmaster et al. |
| 2005/0085197 A1* | 4/2005 | Laroia .................. H01Q 3/24 455/101 |
| 2005/0286650 A1* | 12/2005 | Han .................. H04B 7/0417 375/267 |
| 2015/0094003 A1* | 4/2015 | Ramkumar .......... H04B 7/0604 455/101 |

\* cited by examiner

SWITCHED TRANSMIT ANTENNAS WITH NO FEEDBACK FOR MULTIPATH REDUCTION

CROSS-REFERENCES TO RELATED APPLICATIONS

None

BACKGROUND OF THE INVENTION a) Field of the Invention

The invention relates to a communication system having switched transmit antennas, with no feedback, for multipath reduction.

b) Description of Related Art

In communication systems, transmitted RF signals tend to fade based on multipath interference. Multipath is caused when a transmitted RF signal takes more than one path to a receive antenna based on reflections, such as reflections off the ground or a wall. When the signals arrive at the receive antenna from the various paths, the composite signal, composed of the addition of the signals from different paths, can either undergo constructive or destructive interference. The result of this addition depends on the phase of the signals from the various paths relative to each other.

In an environment that uses a Distributed Antenna System (DAS) to distribute TX signals throughout a given area, the impact of multipath is particularly important. For example, if a DAS is used as part of a Managed Access Service (MAS) system in a prison facility to prevent cellphone usage, then the effects of multipath become extreme because of the numerous concrete walls. A MAS system is used in a prison facility to enable a series of local base stations (BTS) to capture all of the phones in the covered area in order to prevent the phones from connecting to the carrier macro network to place calls.

The prior art shows a variety of attempts, with a great deal of complexity and a requirement for a feedback mechanism, to mitigate the effects of multipath.

U.S. Pat. No. 6,035,183 describes communication between a terminal and a base station in which the base station measures RSSI and BER information for the return link from the terminal. The base station sends this information as feedback to the terminal, and the terminal may use this information to switch from one transmit antenna to another. This system is complex because it requires the measurement of return link information by the base station, as well as a feedback mechanism for sending this information back to the terminal, and finally an analysis and decision by the terminal antenna's switch.

U.S. Pat. No. 8,811,513 discloses communication between a terminal and a base station in which the terminal has multiple transmit antennas. The base station measures return link information and sends feedback to the terminal to switch antennas. Similar to U.S. Pat. No. 6,035,183, this system is complex because it requires the measurement of return link information by the base station, an analysis and decision by the base station, as well as a feedback mechanism for sending this information back to the terminal.

USPN 2005/0085197 (Laroia et al) discloses a communication system for reducing multipath that utilizes explicit and implicit feedback from the receiver to the transmitter. As described in Paragraph 51, explicit feedback is accomplished using channel feedback information 314 which is input to a switching control module 318. As further described in Paragraph 51, implicit feedback can be accomplished using dwell information 320, without using the explicit channel feedback information 314. Unfortunately, USPN 2005/0085197 does not describe a mechanism for switching without using either explicit or implicit feedback.

Previous attempts to mitigate the effects of multipath generally suffer from similar problems. Increased complexity needed to measure channel parameters and a feedback loop to switch the transmit antenna based on the parameters.

SUMMARY OF THE INVENTION

The object of the invention is to provide a communication system having switched transmit antennas, with no feedback, for multipath reduction.

The object is attained in a preferred embodiment of the invention having a communication system comprising a transmitter coupled to a switch, which is further coupled to at least two antennas for switching the transmit signal to one of the antennas, with no feedback. The communication system communicates with at least one receiver for receiving the transmit signal.

In a further embodiment of the invention, the communication system comprises a first transceiver with the transmitter coupled to a switch, which is further coupled to at least two antennas for switching the transmit signal to one of the antennas, with no feedback. The first transceiver further includes a first receiver coupled to a further first antenna. The communication system communicates with at least one secondary transceiver that receives the transmitted signal.

In another embodiment of the invention, the communication system comprises a transmitter coupled to a switch, which is further coupled to at least two antennas for switching the transmit signal to one of the antennas, with no feedback. The communication system communicates with at least one receiver for receiving the transmitted signal. Additionally, the communication system includes an external transmit signal transmitted from an external transmitter to at least one of the receivers. In this system, the signal strength of the transmit signal should dominate the signal strength of the external transmit signal when measured at least one of the receivers.

In a further embodiment of the invention, the communication system comprises a first transceiver coupled to a switch, which is further coupled to at least two antennas for switching the transmit signal to one of the antennas, with no feedback. The first transceiver further includes a first receiver coupled to a further first antenna. The communication system communicates with at least one secondary receiver for receiving the transmit signal. Additionally, the communication system includes an external transmit signal transmitted from an external transmitter to at least one of the secondary receivers. In this system, the signal strength of the transmit signal should dominate the signal strength of the external transmit signal when measured at least one of the secondary receivers.

Advantageous embodiments of the invention, with useful features and improvements of the invention, are described in more detail below.

BRIEF DESCRIPTION OF THE DRAWINGS

The invention is described in detail below by way of preferred embodiments shown in the drawings.

DETAILED DESCRIPTION OF THE PREFERRED EMBODIMENTS

Referring to FIGS. 1-4, a communication system having switched transmit antennas, with no explicit and no implicit feedback from the associated receiver, for multipath reduction will now be described with several preferred embodiments. It is understood that the embodiments described herein do not limit the scope of the invention, but merely provide examples of the present invention as used in several different instances.

Figure 1:
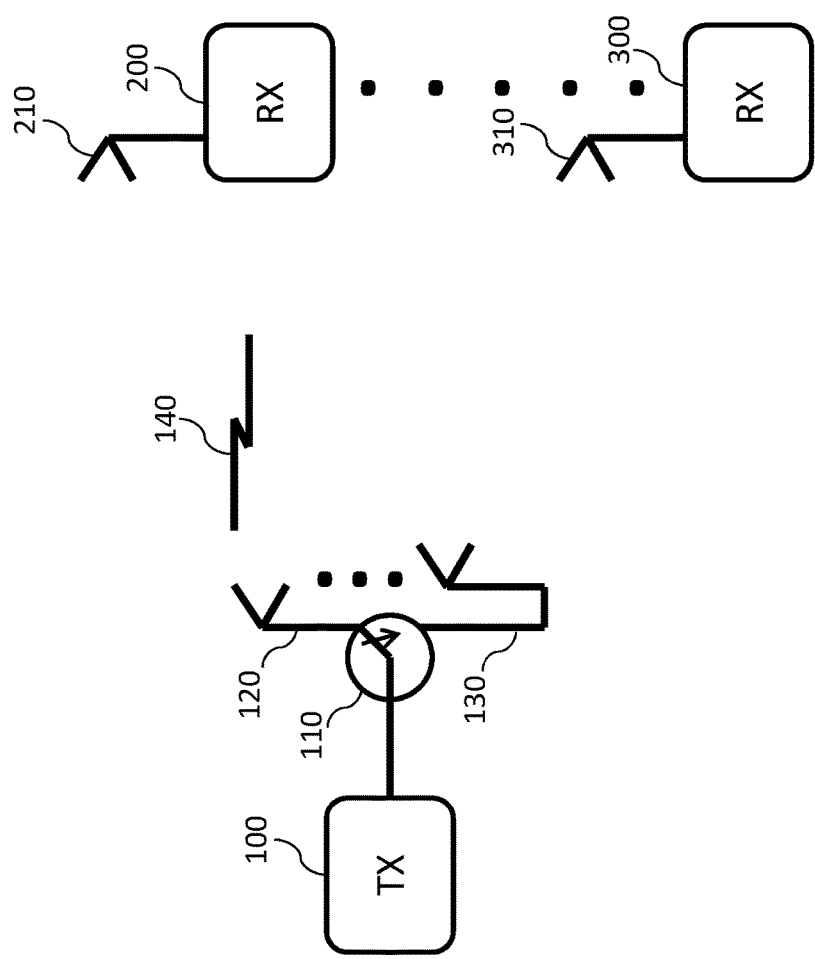
FIG. 1 is a drawing showing a transmitter, coupled to a switch, which is further coupled to at least two antennas for switching the transmit signal to one of the antennas, with no feedback. The transmit signal is received by at least one receiver.

FIG. 1 shows a communication system comprising a transmitter 100 coupled to a switch 110, which is further coupled to at least two antennas 120 & 130 for switching the transmit signal 140 to one of the antennas, with no explicit and no implicit feedback from the associated receiver. The transmit signal 140 is received by at least one receiver 200 & 300 through respective receive antennas 210 & 310.

The switch 110 can be switched periodically based on a fixed time period or based on a random time period. If a fixed time period is used, it can either be equal for all the antennas or different.

Figure 2:
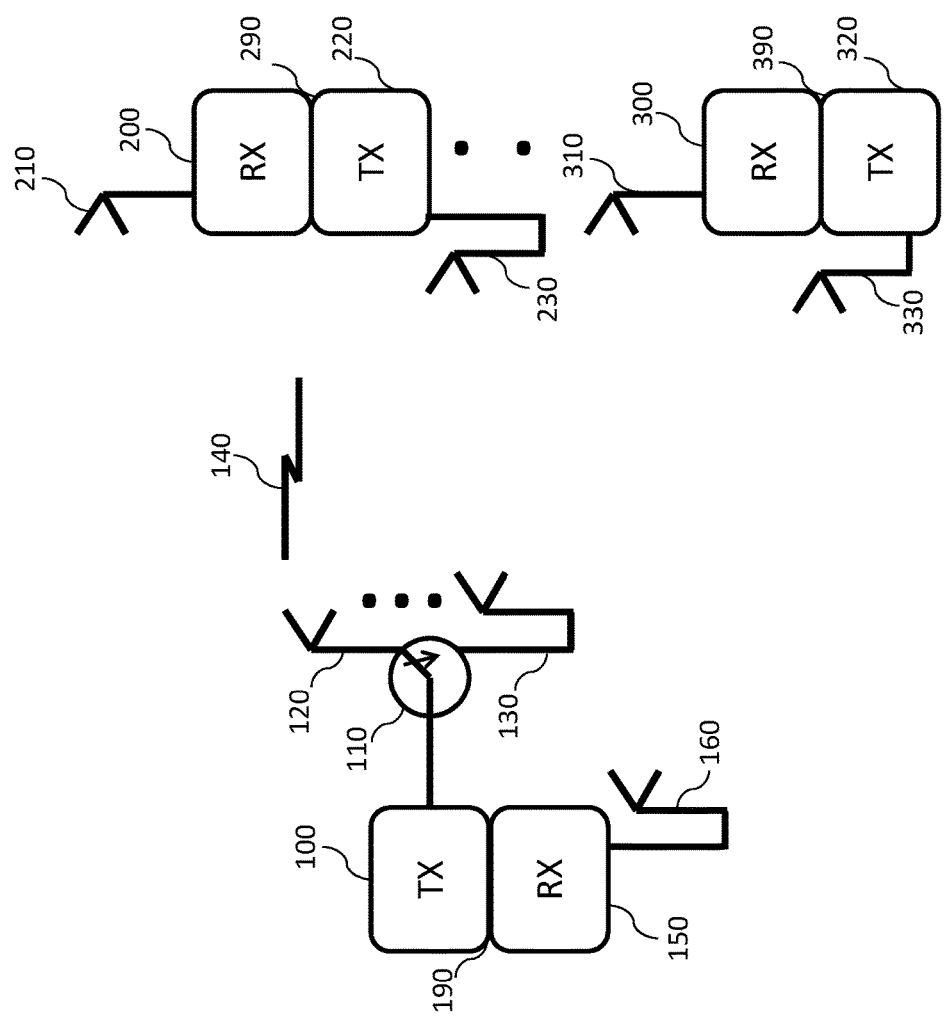
FIG. 2 is a drawing similar to FIG. 1 with transceivers on both ends of the communication link.

FIG. 2 shows a communication system comprising a first transceiver 190 with the associated transmitter 100 coupled to a switch 110, which is further coupled to at least two antennas 120 & 130 for switching the transmit signal 140 to one of the antennas, with no explicit and no implicit feedback from the associated receiver. The first transceiver 190 further includes a first receiver 150 coupled to a first receive antenna 160 for receiving an ambient signal environment (for example, from an external transmitter such as a base station). The transmit signal 140 is received by at least one secondary transceiver 290 and 390. The secondary transceiver 290 and 390 include a respective secondary receiver 200 & 300 coupled to respective further antennas 210 & 310 to receive transmit signal 140. The secondary transceiver 290 and 390 further include a respective secondary transmitter 220 & 320 coupled to respective further antennas 230 & 330.

The switch 110 can be switched periodically based on a fixed time period or based on a random time period. If a fixed time period is used, it can either be equal for all the antennas or different.

Figure 3:
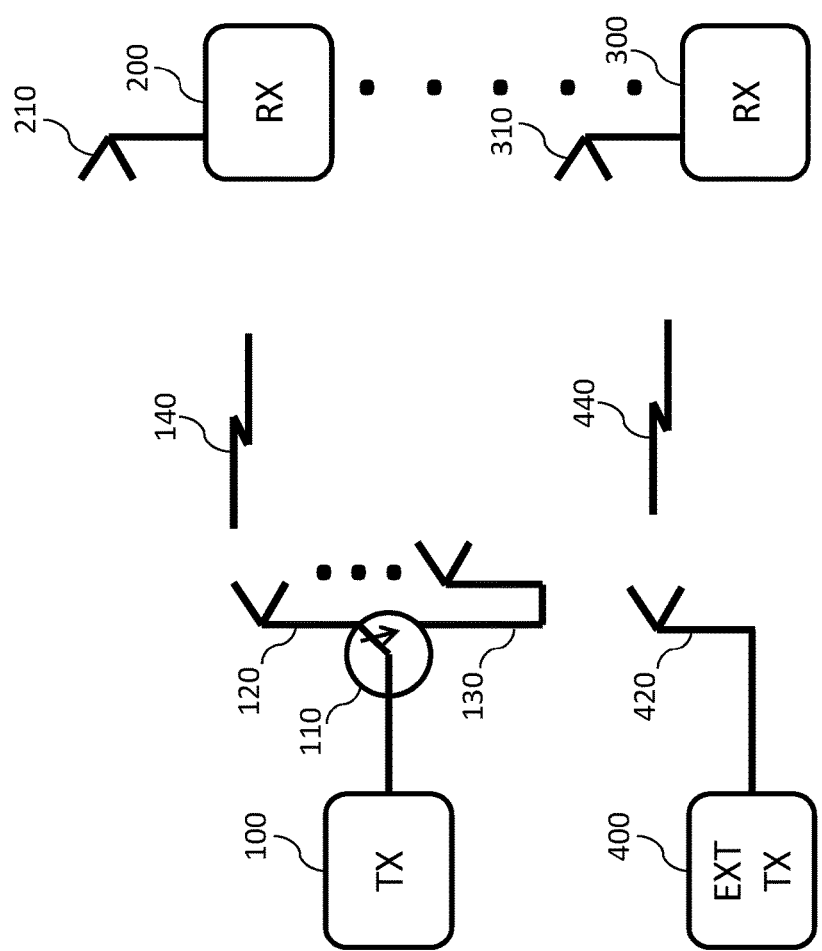
FIG. 3 is a drawing similar to FIG. 1 with the addition of an external transmitter.

FIG. 3 shows a communication system comprising a transmitter 100 coupled to a switch 110, which is further coupled to at least two antennas 120 & 130 for switching the transmit signal 140 to one of the antennas, with no explicit and no implicit feedback from the associated receiver. The communication system further comprises at least one receiver 200 & 300 for receiving the transmit signal 140. Additionally, the communication system includes an external transmitter 400 coupled to an external antenna 420 that is transmitting an external transmit signal 440 to at least one of the receivers 200 & 300. In this system, the signal strength of transmit signal 140 may dominate the signal strength of the external transmit signal 440 when measured at the receiver 200 & 300.

In one embodiment of the invention, the transmitter 100 is a jammer and the transmit signal 140 is a jamming signal that jams the external transmit signal 440 of external transmitter 400.

In another embodiment of the invention, the transmitter 100 is a MAS system and the transmit signal 140 is a MAS signal that dominates the external transmit signal 440 of external transmitter 400.

Figure 4:
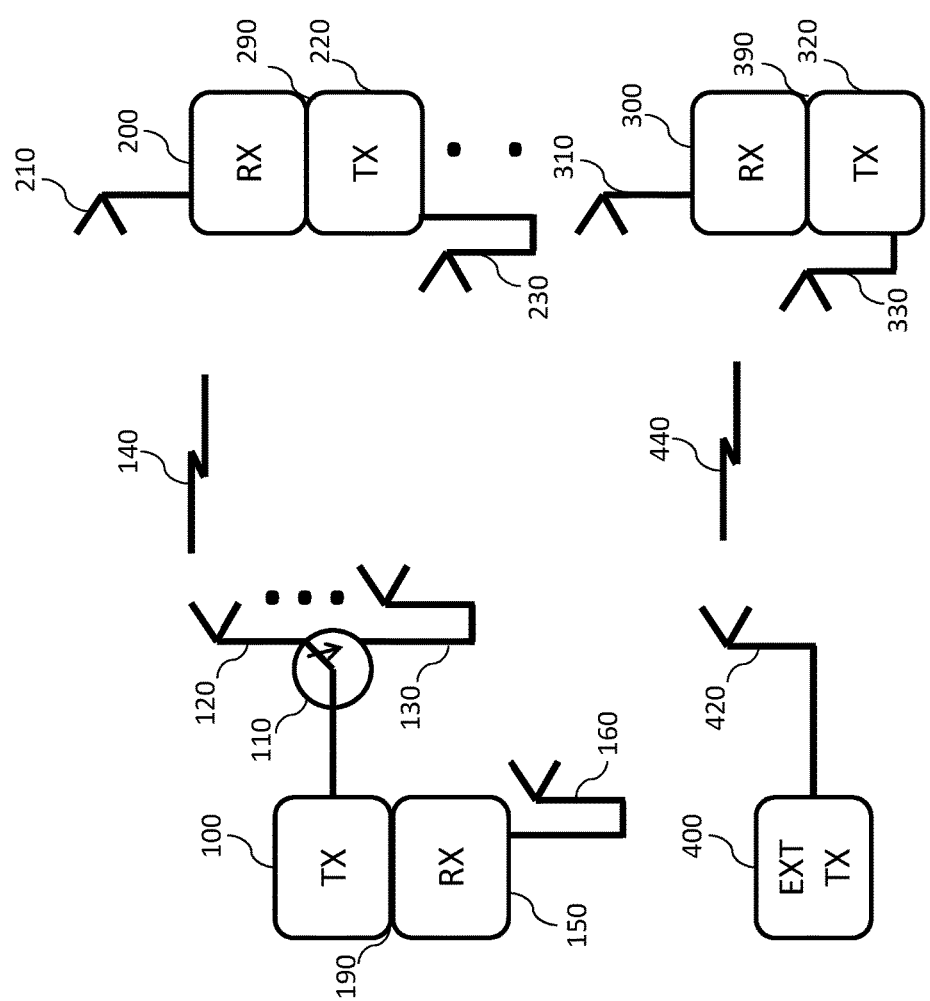
FIG. 4 is a drawing similar to FIG. 2 with the addition of an external transmitter.

FIG. 4 shows a communication system comprising a first transceiver 190 with the associated transmitter 100 coupled to a switch 110, which is further coupled to at least two antennas 120 & 130 for switching the transmit signal 140 to one of the antennas, with no explicit and no implicit feedback from the associated receiver. The first transceiver 190 further includes a first receiver 150 coupled to a first antenna 160 for receiving an ambient signal environment (for example, from an external transmitter such as a base station). The transmit signal 140 is received by at least one secondary transceiver 290 and 390. The secondary transceiver 290 and 390 include a respective secondary receiver 200 & 300 coupled to respective further antennas 210 & 310 to receive transmit signal 140. The secondary transceiver 290 and 390 further include a respective secondary transmitter 220 & 320 coupled to respective further antennas 230 & 330. Additionally, the communication system includes an external transmit signal 440 generated by an external transmitter 400 coupled to an external antenna 420 that is transmitting to at least one of the receivers 200 & 300. In this system, the signal strength of transmit signal 140 should dominate the signal strength of the external transmit signal 440 when measured at least one of the receivers 200 & 300.

In one embodiment of the invention, the transmitter 100 is a jammer and the transmit signal 140 is a jamming signal that jams the external transmit signal 440 of external transmitter 400.

In another embodiment of the invention, the transmitter 100 is a MAS system and the transmit signal 140 is a MAS signal that dominates the external transmit signal 440 of external transmitter 400.

While the present invention has been shown and described with reference to a number of preferred embodiments, it is well known to those of skill in the art that the invention may be practiced otherwise than as specifically disclosed and claimed herein.

For example, although some of the TX and RX antennas are shown as separate antennas, it is well known by those of the ordinary skill in the art that the same effect can be accomplished with a single antenna for TX and RX that uses a diplexer to separate signals.

What is claimed is:

1. A communication system for reducing multipath comprising:
   a transmitter;
   a switch coupled to the transmitter;
   at least two antennas, coupled to the switch, for switching a transmit signal to one of the antennas, wherein the transmit signal is received by at least one receiver through a receive antenna; and
   wherein the switch switches the transmit signal with no explicit and no implicit feedback associated with the at least one receiver.

2. The communication system according to claim 1, wherein the switch is switched periodically based on a fixed time period.

3. The communication system according to claim 1, wherein the switch is switched periodically based on a random time period.

4. The communication system according to claim 2, wherein the fixed time period is equal for each antenna.

5. The communication system according to claim 2, wherein the fixed time period is not equal for each antenna.

6. The communication system according to claim 1, wherein an external transmit signal is transmitted by an external transmitter.

7. The communication system according to claim 6, wherein the transmit signal dominates the external transmit signal.

8. The communication system according to claim 6, wherein the transmitter is a jammer.

9. The communication system according to claim 6, wherein the transmitter is a part of a DAS system.

10. A communication system for reducing multipath comprising:
   a first transmitter;
   a switch, coupled to the first transmitter;
   at least two antennas, coupled to the switch, wherein the switch switches a first transmit signal to one of the antennas;
   a first receiver, associated with the first transmitter; and
   a first receive antenna coupled to the first receiver for receiving an ambient signal environment;
   wherein the first transmit signal is received by at least one secondary receiver, through a secondary receive antenna, and the secondary receiver is associated with at least one respective secondary transmitter, coupled to a secondary transmit antenna; and
   wherein the switch switches the first transmit signal with no explicit and no implicit feedback associated with the at least one secondary receiver.

11. The communication system according to claim 10, wherein the switch is switched periodically based on a fixed time period.

12. The communication system according to claim 10, wherein the switch is switched periodically based on a random time period.

13. The communication system according to claim 11, wherein the fixed time period is equal for each antenna.

14. The communication system according to claim 11, wherein the fixed time period is not equal for each antenna.

15. The communication system according to claim 10, wherein an external transmit signal is transmitted by an external transmitter.

16. The communication system according to claim 15, wherein the first transmit signal dominates the external transmit signal.

17. The communication system according to claim 15, wherein the first transmitter is a jammer.

18. The communication system according to claim 15, wherein the first transmitter is a part of a DAS system.

19. The communication system according to claim 15, wherein the first transmit signal is a jamming signal.

20. The communication system according to claim 15, wherein the first transmit signal is a MAS signal.

\* \* \* \* \*